United States Patent [19]

Tan et al.

[11] Patent Number: 4,517,531
[45] Date of Patent: May 14, 1985

[54] CARRIER WAVE REPRODUCING CIRCUIT IN SYNCHRONIZED DETECTION SYSTEM OF MEDIUM SPEED FACSIMILE

[75] Inventors: Yoichi Tan; Fumio Miyao, both of Kanagawa, Japan

[73] Assignee: Fuji Xerox Co., Ltd., Tokyo, Japan

[21] Appl. No.: 337,190

[22] Filed: Jan. 5, 1982

[30] Foreign Application Priority Data

Jan. 9, 1981 [JP] Japan .................................. 56-1901

[51] Int. Cl.³ .......................... H03L 7/08; H03D 3/00; H04N 1/40
[52] U.S. Cl. ........................................ 331/14; 331/17; 331/23; 331/25; 455/260; 455/265; 358/281; 329/50; 329/122
[58] Field of Search ................ 358/281; 455/260, 265; 331/14, 17, 23, 25; 329/50, 122

[56] References Cited

U.S. PATENT DOCUMENTS 4,130,839 12/1978 McCullough ...................... 358/281
4,313,139 1/1982 Logie .............................. 455/265 X

FOREIGN PATENT DOCUMENTS 114914 9/1979 Japan ................................. 455/265

Primary Examiner—Eugene R. Laroche
Assistant Examiner—D. C. Mis
Attorney, Agent, or Firm—Sughrue, Mion, Zinn, Macpeak & Seas

[57] ABSTRACT

A modulated signal level detecting circuit comprising a synchronized detector 1 of the modulated input signal, a phase-locked loop 5, 14, 16 connected to the input signal for providing a reproduced carrier wave of the input signal, a switch 21 included in the phase-locked loop, and a signal level detecting circuit 22, 23 for detecting the level of the unmodulated signal and opening the switch and thereby breaking the loop when this level exceeds a fixed limit.

8 Claims, 8 Drawing Figures

CARRIER WAVE REPRODUCING CIRCUIT IN SYNCHRONIZED DETECTION SYSTEM OF MEDIUM SPEED FACSIMILE

BACKGROUND OF THE INVENTION

This invention relates to a demodulating circuit for a medium speed facsimile, and more particularly to a carrier wave reproducing circuit in a synchronized detection system.

For transmission in a medium speed facsimile system, an AM-PM-USB modulating system is recommended by CC/TT (international telecommunication association), and a synchronized detecting system has been utilized for the demodulation of the transmitted signal. Such a demodulating method is carried out by extracting phase information from a modulated input signal received by a facsimile receiver. A typical circuit of this kind is illustrated in FIG. 1. As shown therein, a modulated input signal Si is applied to a synchronized detection circuit 1 and an orthogonal deformation compensating filter 2. The output of the filter 2 is applied to a frequency multiplication circuit 3. The output of the circuit 3 having a multiplied frequency is then applied to an input of a phase comparator 4. The phase comparator 4 receives the output signal of a voltage controlled oscillator 6 at its other input, and the compared result is applied to a loop filter 5. The output of the loop filter 5 is used for controlling the oscillation frequency of the oscillator 6. The comparator 4, loop filter 5 and the oscillator 6 constitute a phase synchronizing (locked) loop which delivers a phase synchronized (locked) signal from the oscillator 6. This phase synchronized signal is applied to a frequency divider 7 to be divided into the original frequency, and is then applied to a phase shifting circuit 8 which delivers a reproduced carrier. The reproduced carrier is then applied to another input of the synchronized detection circuit 1 which demodulates the modulated input signal by the use of the reproduced carrier into a demodulated signal So. For this reason, the circuits 2, 3, . . . 8 are collectively referred to as a carrier wave reproducing circuit.

According to the AM-PM-USB modulation system, orthogonal components appear in the modulated wave, and a slight deviation in the orthogonal components tends to create phase jitter. In order to eliminate the phase jitter, the aforementioned circuits 2-6 usually have complicated constructions, and the phase shifting circuit 8 is required for adjusting the phase relation between the input modulated signal and the reproduced carrier wave. Furthermore, the band width of the phase synchronizing loop must be narrowed for reducing the phase jitter even though the narrowing of the band width tends to lengthen pull-in time.

SUMMARY OF THE INVENTION

One object of the present invention is to provide a carrier wave reproducing circuit of a simple construction wherein the amount of the phase jitter is substantially reduced. A further object is to provide a carrier wave reproducing circuit wherein the pull-in time is substantially shortened.

These objectives of the invention are achieved by a carrier wave reproducing circuit comprising switching means provided between the comparator and the loop filter, a band-pass filter of a narrow band for extracting frequency components near the carrier frequency from the input modulated signal, and a level detector for controlling said switching means based on the level of the output of the band-pass filter. In the reproducing circuit having these three above listed components, phase information is extracted only when the image signal is a white signal, and is not extracted when the image signal thereby is a black signal, the black signal tending to introduce phase jitter. However, since most of the image signals in medium speed facsimile are white signals, the carrier wave can be reproduced by the reproducing circuit of the present invention without any disadvantageous effect. Thus, phase jitter can be substantially eliminated out of the carrier wave, and the pull-in time can be substantially shortened. Since phase jitter can be substantially reduced, the construction of the multiplying circuit and the comparator can be substantially simplified.

By the application of the circuit of the present invention to the multiplying system of carrier wave reproduction, the orthogonal deformation compensating filter becomes unnecessary. Thus, the phase deviation in the same filter can be eliminated, and therefore the phase shifting circuit also becomes unnecessary. The circuit of the present invention is applicable to various systems other than the multiplying system, such as a reverse modulation system, coaster loop system and the like. In the reverse modulation system including a phase synchronizing loop similar to that of the multiplying system, the connection in the multiplying system can be used as it is. In the coaster loop system, switching means may be provided in the previous stage of the loop filter as in the other system so that the switching means is controllable by another circuit. Furthermore, the switching means can be easily realized by use of an analog switching circuit, while the narrow band bandpass filter can be realized by a single tuning-point circuit.

BRIEF DESCRIPTION OF THE DRAWINGS

Embodiment of the present invention will now be described in detail with reference to the accompanying drawings, in which.

DETAILED DESCRIPTION OF THE INVENTION

Figure 2:
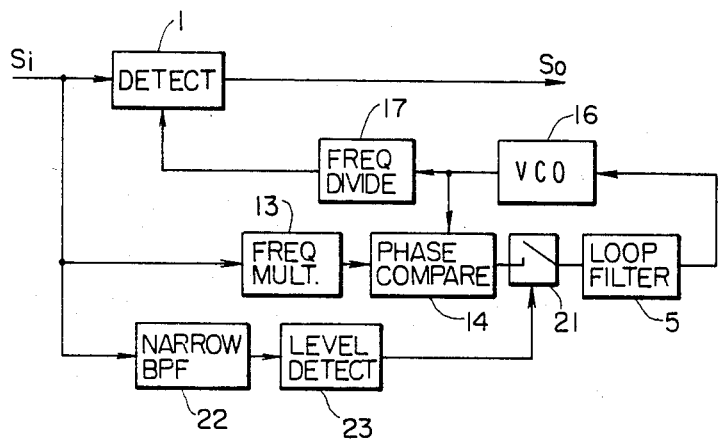
FIG. 2 is a block diagram showing one embodiment of a carrier wave reproducing circuit according to the present invention.
Figure 3:
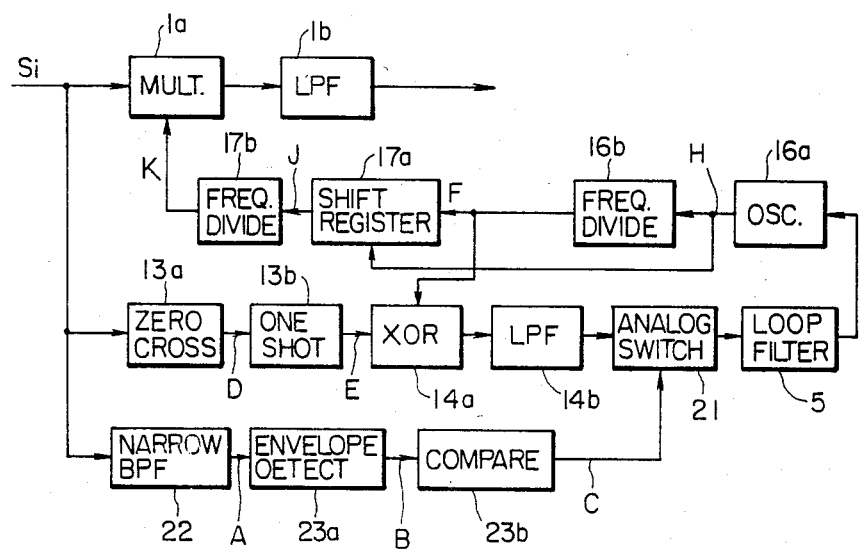
FIG. 3 is a detailed block diagram of FIG. 2.

FIG. 2 shows the general construction of a synchronized demodulation circuit including a carrier wave reproducing circuit according to the present invention, and FIG. 3 shows a more detailed construction of the circuit of FIG. 2.

Figure 1:
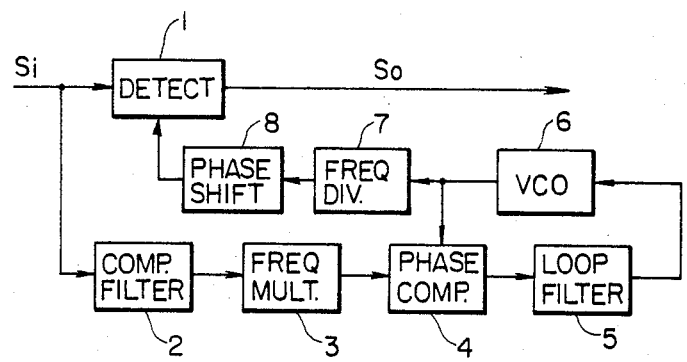
FIG. 1 is a block diagram of a conventional carrier wave reproducing circuit.
Figure 4:
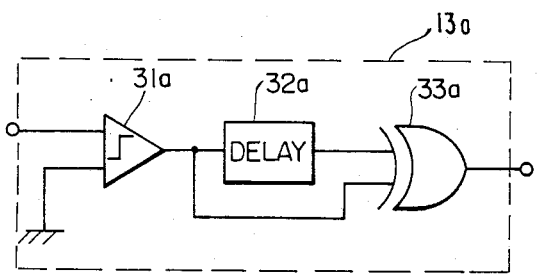
FIG. 4 is a circuit diagram showing one example of a frequency multiplication (doubler) circuit.

In this circuit, a modulated input signal Si is received in a synchronized detection circuit 1 of a similar construction as in FIG. 1 to be modulated by use of a reproduced carrier wave, the resultant demodulated signal So being delivered as the output of the synchronized detection circuit 1. The synchronized detection circuit 1 comprises a multiplier 1a and a low-pass filter 1b (FIG. 3). The modulated input signal Si is also applied to a frequency multiplier circuit 13 for frequency doubling in the carrier wave reproducing circuit of this invention. It should be noted that the orthogonal deformation compensating filter 2 (FIG. 1) is omitted in the construction shown in FIGS. 2 and 3. The frequency multiplier circuit 13 is of a construction far simpler than that of the conventional frequency multiplication circuit 3, the circuit 13 comprising a zero-crossing detection circuit 13a and a one-shot circuit 13b. The zero-cross detecting circuit 13a can be easily realized as shown in FIG. 4 by a level comparator 31a, a delay circuit 32a and an Exclusive Or circuit 33a. The output of the frequency multiplier circuit 13 is received in a phase comparator 14 and compared therein with the output signal from a voltage controlled oscillator 16. The phase comparator 14 can be easily realized by an exclusive OR circuit 14a and a low-pass filter 14b.

According to the present invention, switching means made of an analog switching circuit 21 is provided between the phase comparator 14 and a loop filter 5. Following the loop filter 5, a voltage controlled oscillator 16 of the below described construction is provided. The oscillator 16 comprises an oscillator unit 16a, producing an oscillation signal of a frequency eight times greater than the carrier frequency when the output of the loop filter 5 reaches a predetermined level, and a frequency divider 16b, dividing the output frequency of the oscillator unit 16a into $\frac{1}{4}$. The frequency divider 16b can be easily realized by flip-flops or a shift register.

The output of the voltage controlled oscillator 16 is applied to the phase comparator 14 and also to a frequency divider 17 which divides the frequency into $\frac{1}{2}$. The frequency of the output signal from the oscillator 16 is thus divided into $\frac{1}{2}$ by the frequency divider 17, to be reproduced into the carrier frequency which is sent to the synchronized detection circuit 1. The frequency divider 17 comprises a shift register 17a for delaying the output signal from the oscillator 16 by one cycle period, and an ordinary $\frac{1}{2}$ frequency divider 17b provided in the aft-stage of the shift register 17a. Since the circuit 17 can inherently execute a required phase shifting operation, the phase shifting circuit 8 in FIG. 1 can be eliminated.

According to the present invention, an analog switching circuit 21 is provided between the phase comparator 14 and the loop filter 5 as described above. Furthermore, according to the invention, there are provided a narrow band band-pass filter 22 for extracting components having frequencies near the carrier frequency from the input modulated signal Si, and a level detector 23 which rectifies the output of the filter 22 and turns on the analog switching circuit 21 when the level of the rectified output is higher than a predetermined threshold value. The narrow band band-pass filter 22 can be realized by a single tuning point circuit, while the level detector 23 can be realized by an envelope detector 23a and a comparator 23b. With the above described construction, the analog switching circuit 21 is brought into an ON state only when the level of the carrier frequency components in the input modulated signal Si is higher than the predetermined level, i.e. only when a white signal is present, thereby operating a phase synchronizing loop comprising the phase comparator 14, loop filter 5 and the oscillator 16. The oscillator 16 may be of a well-known type which will free run at a frequency substantially at the carrier frequency in the absence of any control input, so that, when the synchronizing loop is "disabled" by the switch 21, the carrier will still be reproduced at the detector 1 for demodulation purposes. Thus, it is only the phase lock which is disabled. During this time, the phase of the reproduced carrier may tend to drift with respect to the proper phase, but over all time the signal is predominately white information so the drift will not typically have time to accumulate and therefore will not be significant, and the interim carrier frequency can be "picked up", i.e. phase lock can be re-established, when the white signal resumes.

The power spectrum of the input modulated signal expands where black and white levels of an image signal appear frequently as in the character portion of the signal, and converges near the carrier frequency for an image signal having a wide portion or marginal area. Since most of the image signals appearing in the medium speed facsimile are white signals, the power spectrum of the input modulated signal thereof converges to the carrier wave frequency and the nearby area. In consideration of this fact, the narrow band-pass filter 22 is used for controlling the switching circuit 21 so that phase information is extracted only from the white signal portion, discarding signal portions which expand the power spectrum. However, there are cases wherein the image signal includes predominately black signals, and since the phase synchronization must be maintained regardless of such cases, the band width of the band-pass filter 22 is so selcted that the carrier frequency component sent during the lost time (about 5% of one scanning period) can be picked up even in a worst case.

Figure 5:
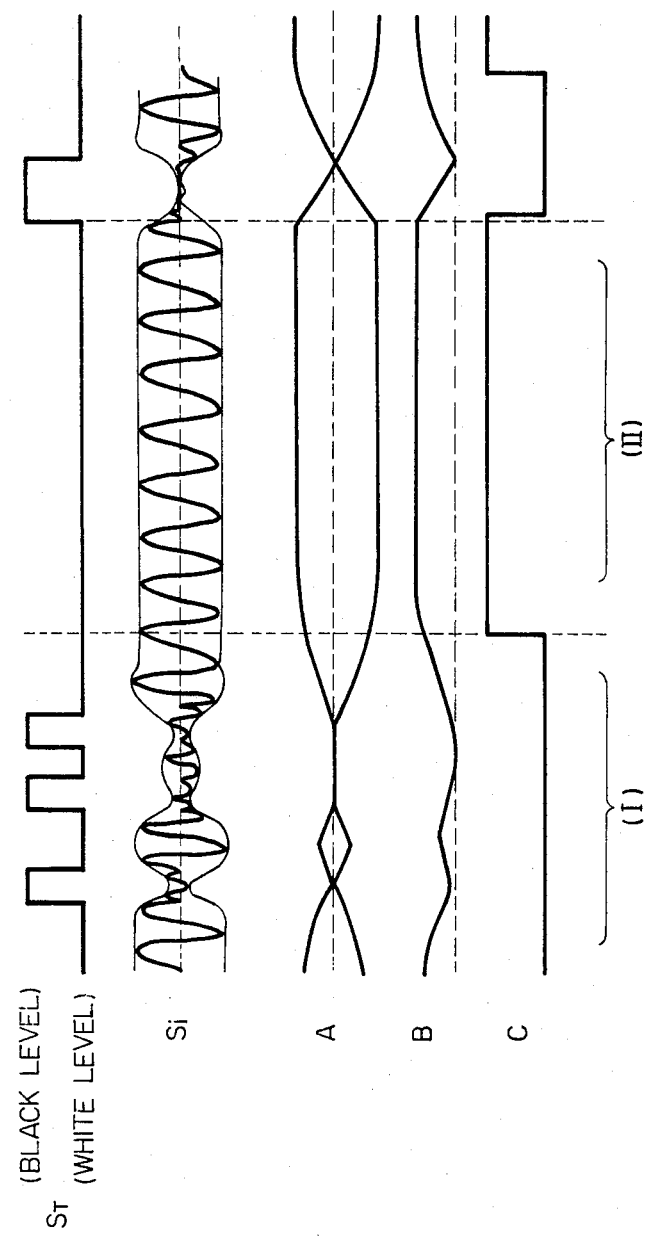
FIG. 5 is a waveform diagram for the circuit shown in FIG. 2.

In FIG. 5, relations between a read-out image signal $S_T$, modulated input signal Si, output A from the narrow band filter 22, output B from the envelope detector 23a, and output C from the comparator 23b are indicated for a comparatively long time interval. In FIG. 5, the output from the band-pass filter 22 is low for the part I where black and white variation is severe. As a result, the output from the comparator 23b becomes low, turning the analog switching circuit 21 into an OFF state. Conversely, the output from the band-pass filter 22 is high in the part II where the signal is continuously in the white level, because the modulated input signal Si in this part is simply made up of a carrier frequency component. Thus, the output C of the comparator 23b becomes high, and the switching circuit 21 is turned ON.

Figure 6:
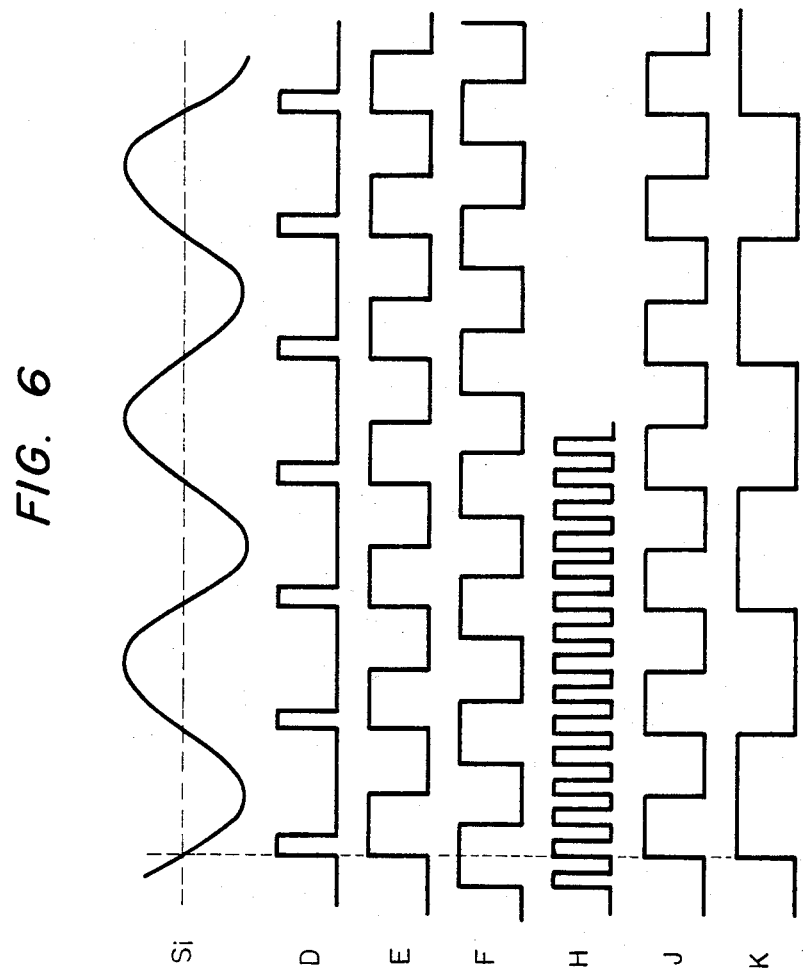
FIG. 6 is a waveform diagram showing one part of FIG. 5 on an enlarged scale.

FIG. 6 shows waveforms of the various parts of FIG. 3 with part II of FIG. 5 being shown on an expanded time scale. The input modulated signal Si in FIG. 6 is indicated as a carrier wave of a substantially constant amplitude and phase angle, because the signal Si in the part II consists merely of the carrier wave. The zero-cross detecting circuit 13a delivering the output D operates as a frequency doubler delivering two pulses in one cycle period of the carrier wave. The one-shot circuit 13b shapes the output of the zero-cross detecting circuit 13a into a pulse train E having a duty cycle of approximately 50%. The voltage controlled oscillator 16a generates a pulse signal designated by H, and therefore the $\frac{1}{4}$ frequency divider 16b delivers an output signal designated by F. The phases of the signals E and F are compared in the phase comparator 14, and the output of the comparator 14 is applied through the analog switching circuit 21 (kept ON in this case) to the loop filter 5. The output of the loop filter 5 controls the voltage controlled oscillator 16a. The output F of the ¼ frequency divider 16b is delayed by the shift register 17a for one cycle period of the output H generated from the oscillator unit 16a, the delayed signal being designated by J. The signal J is then applied to the frequency divider 17b for reducing the frequency to ½, and the resultant signal K is applied to the synchronized detection circuit 1 as a reproduced carrier wave. Although the reproduced carrier wave may sometimes have a polarity opposite that shown in FIG. 6, no adverse effect is thereby caused because the demodulated signal So is thereafter passed through an absolute value detecting circuit. (not shown)

Figure 7:
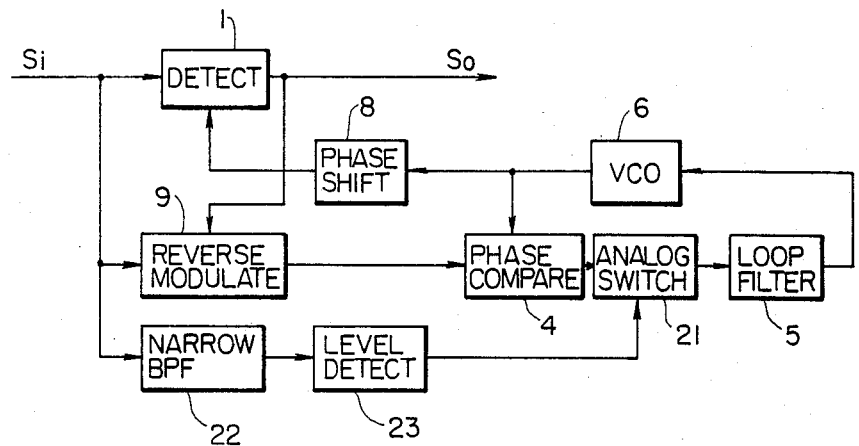
FIG. 7 is a block diagram showing another embodiment of the present invention.
Figure 8:
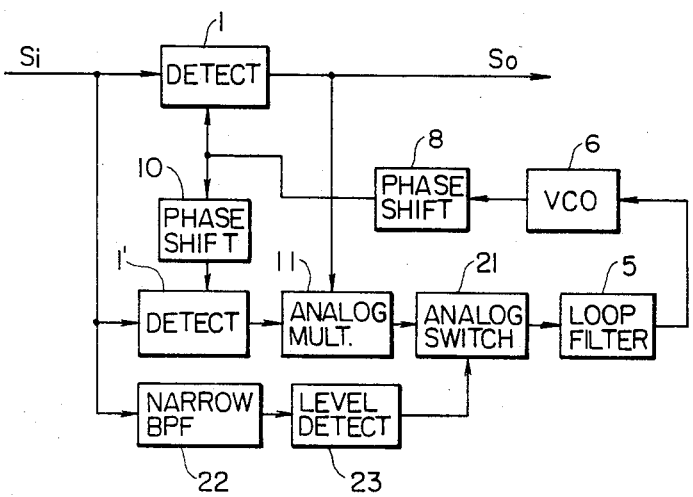
FIG. 8 is a block diagram showing still another embodiment of the invention.

Concerning only the carrier wave reproducing circuitry, (1) a multiplying system, (2) a reverse modulating system, and (3) a coaster loop system are known. Although the invention has been described with respect to an example utilizing the multiplying system, it is apparent that the invention is not necessarily limited to the circuit utilizing the multipying system, but is applicable as well to those utilizing the reverse modulating system and the coaster loop system. An example utilizing the reverse modulating system is shown in FIG. 7, while an example utilizing the coaster loop system is shown in FIG. 8. In these examples, no orthogonal deformation compensating filter need be provided.

In the example shown in FIG. 7, the modulated input signal Si and the output signal So from the synchronized detection circuit 1 are both applied to a reverse modulating circuit 9 so that the signal Si is reverse modulated (in this example, modulated by phase inverted signal So) therein. Thus, the two phase conditions of the input modulated signal are aligned with each other, and the output of the reverse modulating circuit 9 is processed by a phase synchronizing loop comprising the phase comparator 4, loop filter 5, and the voltage controlled oscillator 6. The signal thus processed is then passed through the fixed phase shifting circuit 8 for obtaining a reproduced carrier wave. In this case, the analog switching circuit 21 of this invention is inserted, as in the multiplying system, between the phase comparator 4 and the loop filter 5, and is controlled by the circuits 22 and 23 for obtaining a predetermined carrier wave.

On the other hand, in the example shown in FIG. 8 utilizing the coaster loop system, a synchronized detection circuit 1' identical to the circuit 1 is used in the carrier wave reproducing circuit. Besides the modulated input signal Si, a signal obtained by taking the reproduced carrier wave delivered from the fixed phase shifting circuit 8' and further phase-shifting it in another phase shifting circuit 10 by 90° is also applied to the synchronized detection circuit 1'. The output signal from the synchronized detection circuit 1' and the output signal So are applied to an analog multiplying circuit 11 for obtaining an output similar to the output of the phase comparator 4 or 14 in the above described examples. The output of the analog multiplying circuit 11 is then processed by the loop filter 5, voltage controlled oscillator 6, and the fixed phase shifting circuit 8 for obtaining a desired reproduced carrier wave. In this case, the analog switching circuit 21 of the present invention is inserted between the multiplying circuit 11 and the loop filter 5, and is controlled by the circuits 22 and 23 in the reproduction of the carrier wave.

According to the present invention, since the information causing the orthogonal deformation is completely removed from the input signal, the possibility of producing phase jitter in the carrier wave can be substantially eliminated. Furthermore, there is no necessity of suppressing the phase jitter in part of the phase synchronizing loop, and therefore various advantageous effects such as widening the pass-band, shortening the pull-in time, and simplifying the construction of the loop can be obtained, while making it unnecessary to use the phase adjusting circuit. The narrow band band-pass filter is not only advantageous for extracting a desired frequency component, but also effective for eliminating outside noise, such as heat induced noise and charging or discharging pulses, and preventing the carrier wave reproducing circuit from stepping out of synchronism. Since the phase jitter is eliminated and the pull-in time is shortened as described above, there is no necessity of changing the band width of the loop between the initial period and the communication thereafter of the facsimile. In addition, in a case where a transmission system sending out a single tone as a white line skip signal is utilized, the adverse effect of the signal can be eliminated by suitably selecting the pass-band of the band-pass filter.

What is claimed is:

1. In a signal demodulator circuit for demodulating a modulated input signal containing black information and white information, said demodulator of the type including a synchronized detector for receiving said modulated input signal and detecting said modulated input signal, a carrier reproducing circuit for generating a reproduced carrier from said modulated input signal and applying said reproduced carrier to said synchronized detector, said modulated input signal including signal portions representing said black information and signal portions representing said white information, the improvement characterized in that: said carrier reproducing circuit includes a phase synchronizing loop connected to receive said modulated input signal for providing said reproduced carrier to said synchronized detector; and disabling means for disabling a phase locking of said phase synchronizing loop in response to a predetermined level of representation of said black information, said loop continues to provide an output even when not phase locked; and said phase synchronizing loop comprises:

a voltage controlled oscillator (6), a phase comparator (14) whose inputs are connected to receive said modulated input signal and to receive the output signal of said voltage controlled oscillator, and a loop filter (5) whose input is connected to the output of said phase comparator and whose output is connected to the control terminal of said voltage controlled oscillator through which the output signal of said comparator is applied to the control terminal of said voltage controlled oscillator for controlling the oscillation frequency of said oscillator, said disabling means comprising:

switching means (21) provided between the output of said phase comparator and the input of said loop filter; and signal detection means for detecting said predetermined level of representation of said black information and controlling said switching means in accordance with said detected level; and said signal detection means comprises:

a band-pass filter (22) of a narrow band connected to receive said modulated input signal for extracting frequency components applied thereto near the carrier frequency of said modulated input signal; and a level detector (23) for controlling said switching means based on said level derived from the output signal of said band-pass filter.

2. A signal demodulator circuit as set forth in claim 1 wherein a frequency multiplying circuit has an input connected to receive said modulated input signal and an output connected to said phase comparator, and a frequency dividing circuit has an input connected to the voltage controlled oscillator output and an output connected to said synchronized detector for delivering said reproduced carrier wave phase which is synchronized with the original carrier wave.

3. A signal demodulator circuit as set forth in claim 1 wherein said switching means is an analog switching circuit.

4. A signal demodulator circuit as set forth in claim 1 wherein said band-pass filter comprises a single frequency tuning circuit tuned to the carrier wave of said modulated input signal.

5. A signal demodulator circuit as set forth in claim 1 wherein a reverse modulating circuit is provided, whose output is connected to an input of said phase comparator, for receiving the modulated input signal and an output of said synchronized detector on its inputs, and for providing a reverse modulated signal to said phase comparator; and wherein a fixed phase shifting circuit which delivers a phase synchronized reproduced carrier wave is provided following said voltage controlled oscillator.

6. A signal demodulator circuit as claimed in claim 14, wherein said synchronized detector is a first synchronized detector and said phase comparator comprises:

a first phase shifting circuit (8') for shifting the phase of the output of said oscillator, a second phase shifting circuit (10) for shifting the phase of the output of said first phase shifting circuit, a second synchronized detection circuit (1') for receiving the output signal from said second phase shifting circuit, and an analog multiplier (11) for multiplying the output signal from said second synchronized detection circuit with an output signal of said first synchronized detector.

7. A signal demodulator circuit as set forth in claim 6 wherein said switching means is an analog switching circuit.

8. A signal demodulator circuit as set forth in claim 6 wherein said band-pass filter of a narrow band is a single frequency tuning circuit tuned to the carrier wave of the modulated input signal.

* * * * *